(12) United States Patent
Dubreuil et al.

(10) Patent No.: US 10,808,624 B2
(45) Date of Patent: Oct. 20, 2020

(54) TURBINE ROTOR WITH LOW OVER-SPEED REQUIREMENTS

(71) Applicant: PRATT & WHITNEY CANADA CORP., Longueuil (CA)

(72) Inventors: Jean Dubreuil, Boucherville (CA); Ghislain Plante, Verdun (CA); Philippe Beauchesne-Martel, Brossard (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 270 days.

(21) Appl. No.: 15/428,572

(22) Filed: Feb. 9, 2017

(65) Prior Publication Data
US 2018/0223739 A1    Aug. 9, 2018

(51) Int. Cl.
*F02C 7/32* (2006.01)
*B64D 27/10* (2006.01)
(Continued)

(52) U.S. Cl.
CPC ........... *F02C 7/32* (2013.01); *B64D 27/10* (2013.01); *F01D 15/00* (2013.01); *F01D 15/10* (2013.01); *F01D 15/12* (2013.01); *F02C 3/10* (2013.01); *F02C 3/103* (2013.01); *F02C 3/107* (2013.01); *F02C 3/145* (2013.01); *F02C 6/20* (2013.01); *F02C 6/206* (2013.01); *F02C 7/36* (2013.01); *F04D 29/053* (2013.01); *F04D 29/321* (2013.01); *F05D 2220/323* (2013.01); *F05D 2220/324* (2013.01); *F05D 2220/329* (2013.01);
(Continued)

(58) Field of Classification Search
CPC .... F02C 7/32; F02C 3/103; F02C 3/10; F02C 3/145; F02C 6/206; F02C 6/20; F02C 3/107; F02C 7/36; F01D 15/00; F01D 15/10; F01D 15/12; B64D 27/10; F04D 29/053; F04D 29/321; F05D 2220/324; F05D 2240/61; F05D 2220/329; F05D 2220/323; F05D 2240/60; F05D 2260/4031
See application file for complete search history.

(56) References Cited

U.S. PATENT DOCUMENTS 2,548,975 A    4/1951    Hawthorne
2,747,367 A    5/1956    Savin
(Continued)

FOREIGN PATENT DOCUMENTS

CA    2562290 C    10/2013
CA    2970386      1/2018
(Continued)

OTHER PUBLICATIONS

European Search Report dated Mar. 19, 2018 in related EP application No. 17182087.1.
(Continued)

*Primary Examiner* — David Hamaoui
(74) *Attorney, Agent, or Firm* — Norton Rose Fulbright Canada LLP

(57) ABSTRACT

A method and a turbine rotor system for reducing over-speed potential of a turbine of a gas turbine engine involve mechanically connecting the turbine to at least two mechanical loads via first and second mechanical drives extending in opposite directions from the turbine.

12 Claims, 1 Drawing Sheet

(51) Int. Cl.
*F02C 3/107* (2006.01)
*F02C 7/36* (2006.01)
*F01D 15/10* (2006.01)
*F01D 15/12* (2006.01)
*F04D 29/32* (2006.01)
*F04D 29/053* (2006.01)
*F02C 3/10* (2006.01)
*F02C 6/20* (2006.01)
*F01D 15/00* (2006.01)
*F02C 3/14* (2006.01)

(52) U.S. Cl.
CPC ...... *F05D 2240/60* (2013.01); *F05D 2240/61* (2013.01); *F05D 2260/4031* (2013.01)

(56) References Cited

U.S. PATENT DOCUMENTS

| | | | |
|---|---|---|---|
| 2,929,207 A | 3/1960 | Peterson | |
| 2,955,424 A | 10/1960 | Hryniszak | |
| 2,984,977 A | 5/1961 | Embree | |
| 3,152,443 A | 10/1964 | Newland | |
| 3,170,292 A | 2/1965 | Howes | |
| 3,204,406 A | 9/1965 | Howes | |
| 3,209,536 A | 10/1965 | Howes | |
| 3,255,825 A | 6/1966 | Mouille et al. | |
| 3,488,947 A | 1/1970 | Miller | |
| 3,529,419 A | 9/1970 | Reed | |
| 3,762,161 A | 10/1973 | Pennig | |
| 3,874,811 A | 4/1975 | Dennison | |
| 4,055,949 A | 11/1977 | Boudigues | |
| 4,141,212 A | 2/1979 | Koschier | |
| 4,251,987 A | 2/1981 | Adamson | |
| 4,498,291 A * | 2/1985 | Jeffery | F01D 21/045 415/9 |
| 4,531,694 A | 7/1985 | Soloy | |
| 4,611,464 A | 9/1986 | Hetzer et al. | |
| 4,685,286 A | 8/1987 | Hetzer et al. | |
| 4,815,282 A | 3/1989 | Wilkinson et al. | |
| 4,817,382 A | 4/1989 | Rudolph et al. | |
| 4,864,812 A | 9/1989 | Rodgers | |
| 5,119,624 A | 6/1992 | McKenna | |
| 5,159,808 A | 11/1992 | Kast | |
| 5,161,364 A | 11/1992 | Bruun | |
| 5,309,708 A | 5/1994 | Stewart | |
| 5,694,765 A * | 12/1997 | Hield | F02C 3/113 60/39.163 |
| 6,041,589 A | 3/2000 | Giffin, III et al. | |
| 6,082,967 A | 7/2000 | Loisy | |
| 6,247,668 B1 | 6/2001 | Reysa | |
| 6,735,954 B2 | 5/2004 | MacFarlane et al. | |
| 6,855,089 B2 | 2/2005 | Poulin | |
| 6,865,891 B2 | 3/2005 | Walsh et al. | |
| 6,895,741 B2 | 5/2005 | Rago et al. | |
| 6,901,759 B2 | 6/2005 | Frutschi | |
| 7,055,303 B2 | 6/2006 | Macfarlane et al. | |
| 7,144,349 B2 | 12/2006 | Mitrovic | |
| 7,168,913 B2 | 1/2007 | Lardellier | |
| 7,500,365 B2 | 3/2009 | Suciu et al. | |
| 7,552,591 B2 | 6/2009 | Bart | |
| 7,690,185 B2 | 4/2010 | Linet et al. | |
| 7,698,884 B2 | 4/2010 | Maguire et al. | |
| 7,707,909 B2 | 5/2010 | Linet et al. | |
| 7,758,302 B2 | 7/2010 | Linet et al. | |
| 7,762,084 B2 * | 7/2010 | Martis | F01D 15/10 60/39.091 |
| 7,775,044 B2 * | 8/2010 | Julien | F02C 3/055 60/614 |
| 8,176,725 B2 * | 5/2012 | Norris | F02C 7/32 60/226.1 |
| 8,209,952 B2 | 7/2012 | Ress, Jr. | |
| 8,220,245 B1 | 7/2012 | Papandreas | |
| 8,350,398 B2 | 1/2013 | Butt | |
| 8,459,038 B1 * | 6/2013 | Lickfold | F02K 3/025 60/772 |
| 8,464,511 B1 | 6/2013 | Ribarov et al. | |
| 8,500,583 B2 | 8/2013 | Goi et al. | |
| 8,516,789 B2 | 8/2013 | Kupratis | |
| 8,568,089 B2 | 10/2013 | Lemmers, Jr. et al. | |
| 8,621,871 B2 | 1/2014 | McCune et al. | |
| 8,794,922 B2 | 8/2014 | Bart et al. | |
| 8,853,878 B1 | 10/2014 | White | |
| 9,062,611 B2 | 6/2015 | Sheridan | |
| 9,126,691 B2 | 9/2015 | Cloft | |
| 9,145,834 B2 | 9/2015 | Frost et al. | |
| 9,239,004 B2 | 1/2016 | Kupratis | |
| 9,297,305 B2 | 3/2016 | Drachsler et al. | |
| 9,322,341 B2 * | 4/2016 | Belleville | F02D 29/02 |
| 9,328,667 B2 | 5/2016 | MacFarlane | |
| 9,341,121 B2 | 5/2016 | Kupratis | |
| 9,353,848 B2 | 5/2016 | Blewett et al. | |
| 9,512,784 B2 | 12/2016 | Morgan et al. | |
| 9,828,911 B2 | 1/2017 | Burghardt | |
| 9,719,465 B2 | 8/2017 | Suciu | |
| 9,745,860 B1 | 8/2017 | Haskin | |
| 9,752,500 B2 * | 9/2017 | Ullyott | F02C 3/113 |
| 9,784,182 B2 * | 10/2017 | Dhanuka | F02C 3/22 |
| 9,819,292 B2 * | 11/2017 | Thatcher | H02P 9/04 |
| 9,890,704 B2 | 2/2018 | Speak et al. | |
| 9,926,849 B2 | 3/2018 | Frost et al. | |
| 9,932,858 B2 * | 4/2018 | Miller | F01D 25/164 |
| 9,973,058 B2 * | 5/2018 | Perkinson | B64C 11/06 |
| 10,054,001 B2 | 8/2018 | Beutin et al. | |
| 10,072,570 B2 | 9/2018 | Kupratis | |
| 10,094,295 B2 | 10/2018 | Ullyott et al. | |
| 10,125,722 B2 | 11/2018 | Kupratis | |
| 10,393,027 B2 * | 8/2019 | Lefebvre | F02C 6/206 |
| 10,436,060 B2 * | 10/2019 | Dubreuil | F01D 21/003 |
| 2005/0060273 A1 | 3/2005 | Lardellier | |
| 2006/0010152 A1 * | 1/2006 | Catalano | G06Q 10/06 |
| 2006/0137355 A1 | 6/2006 | Welch et al. | |
| 2007/0240427 A1 | 10/2007 | Ullyott | |
| 2008/0081733 A1 | 4/2008 | Hattenbach | |
| 2008/0138195 A1 | 6/2008 | Kern | |
| 2008/0148881 A1 | 6/2008 | Moniz et al. | |
| 2009/0015011 A1 | 1/2009 | Colin | |
| 2009/0188334 A1 | 7/2009 | Merry | |
| 2009/0288421 A1 | 11/2009 | Zeiner | |
| 2009/0322088 A1 | 12/2009 | Dooley | |
| 2010/0164234 A1 | 7/2010 | Bowman | |
| 2010/0180568 A1 | 7/2010 | Sachs | |
| 2010/0212285 A1 | 8/2010 | Negulescu | |
| 2010/0281875 A1 * | 11/2010 | Price | F01D 17/162 60/772 |
| 2011/0056208 A1 | 3/2011 | Norris | |
| 2011/0171030 A1 | 7/2011 | Swift | |
| 2011/0284328 A1 | 11/2011 | Brandt | |
| 2013/0031912 A1 | 2/2013 | Finney | |
| 2013/0056982 A1 | 3/2013 | Gozdawa | |
| 2013/0098066 A1 | 4/2013 | Gallet | |
| 2013/0139518 A1 | 6/2013 | Morgan | |
| 2013/0145769 A1 | 6/2013 | Norris | |
| 2013/0186058 A1 | 7/2013 | Sheridan | |
| 2013/0255224 A1 | 10/2013 | Kupratis | |
| 2014/0069107 A1 | 3/2014 | Macfarlane | |
| 2014/0130352 A1 | 5/2014 | Buldtmann et al. | |
| 2014/0150401 A1 | 6/2014 | Venter | |
| 2014/0250862 A1 | 9/2014 | Suciu et al. | |
| 2014/0252160 A1 | 9/2014 | Suciu et al. | |
| 2014/0255147 A1 | 9/2014 | Root | |
| 2014/0256494 A1 | 9/2014 | Lewis | |
| 2014/0260295 A1 | 9/2014 | Ullyott | |
| 2014/0290265 A1 | 10/2014 | Ullyott | |
| 2014/0297155 A1 | 10/2014 | Chen | |
| 2015/0013307 A1 | 1/2015 | Burghardt | |
| 2015/0150401 A1 | 6/2015 | Bennett | |
| 2015/0167549 A1 | 6/2015 | Ribarov | |
| 2015/0337738 A1 | 11/2015 | Suciu | |
| 2015/0369123 A1 | 12/2015 | Hanrahan | |
| 2015/0377125 A1 | 12/2015 | Kupratis | |
| 2016/0040601 A1 | 2/2016 | Frost | |
| 2016/0090871 A1 | 3/2016 | Olsen | |
| 2016/0138478 A1 * | 5/2016 | Negulescu | F02C 3/04 415/122.1 |

(56) References Cited

U.S. PATENT DOCUMENTS

| | | |
|---|---|---|
| 2016/0169118 A1 | 6/2016 | Duong |
| 2016/0201490 A1 | 7/2016 | Scott |
| 2016/0208690 A1 | 7/2016 | Zimmitti |
| 2016/0215694 A1 | 7/2016 | Brostmeyer |
| 2016/0230843 A1 | 8/2016 | Duong et al. |
| 2016/0245185 A1 | 8/2016 | Lamarre et al. |
| 2016/0290226 A1 | 10/2016 | Roberge |
| 2016/0305261 A1 | 10/2016 | Orosa |
| 2016/0305324 A1* | 10/2016 | Magowan ............... F02C 3/107 |
| 2016/0319845 A1 | 11/2016 | Molnar |
| 2016/0333791 A1 | 11/2016 | Snyder et al. |
| 2016/0341214 A1 | 11/2016 | O'Toole |
| 2016/0363055 A1 | 12/2016 | Edwards |
| 2017/0108084 A1* | 4/2017 | Chmylkowski ......... F01D 15/12 |
| 2017/0122122 A1 | 5/2017 | Lepretre |
| 2017/0191413 A1 | 7/2017 | Knight |
| 2017/0211477 A1 | 7/2017 | Menheere |
| 2017/0211484 A1 | 7/2017 | Sheridan |
| 2017/0306841 A1 | 10/2017 | Skertic |
| 2017/0314469 A1 | 11/2017 | Roever |
| 2017/0314474 A1 | 11/2017 | Wotzak |
| 2017/0327241 A1 | 11/2017 | Mitrovic |
| 2017/0356347 A1 | 12/2017 | Scothern et al. |
| 2017/0356452 A1 | 12/2017 | Mastro |
| 2017/0370284 A1 | 12/2017 | Harvey |
| 2018/0016989 A1 | 1/2018 | Abe |
| 2018/0023481 A1 | 1/2018 | Lefebvre |
| 2018/0023482 A1* | 1/2018 | Lefebvre ................ F02C 3/113 |
| | | 415/68 |
| 2018/0045068 A1 | 2/2018 | Brinson et al. |
| 2018/0058330 A1 | 3/2018 | Munevar |
| 2018/0073428 A1* | 3/2018 | Morgan .................... F02C 7/32 |
| 2018/0073429 A1* | 3/2018 | Dubreuil ................ F02C 3/145 |
| 2018/0073438 A1 | 3/2018 | Durocher et al. |
| 2018/0135522 A1 | 5/2018 | Mitrovic et al. |
| 2018/0149091 A1 | 5/2018 | Howell et al. |
| 2018/0163640 A1* | 6/2018 | Dubreuil ................... F02C 3/04 |
| 2018/0171815 A1 | 6/2018 | Suciu et al. |
| 2018/0172012 A1* | 6/2018 | Plante .................. F04D 25/045 |
| 2018/0202310 A1 | 7/2018 | Suciu et al. |
| 2018/0202368 A1 | 7/2018 | Suciu et al. |
| 2018/0208322 A1 | 7/2018 | Tantot |
| 2018/0216525 A1 | 8/2018 | Plante et al. |
| 2018/0223739 A1 | 8/2018 | Dubreuil et al. |
| 2018/0283281 A1 | 10/2018 | Veilleux, Jr. et al. |
| 2018/0291817 A1 | 10/2018 | Suciu et al. |
| 2018/0313274 A1 | 11/2018 | Suciu et al. |
| 2018/0347471 A1 | 12/2018 | Wotzak |

FOREIGN PATENT DOCUMENTS

| | | |
|---|---|---|
| CA | 2970389 | 1/2018 |
| CA | 2975558 | 6/2018 |
| EP | 0103370 | 3/1984 |
| EP | 0860593 B1 | 9/2003 |
| EP | 1908938 | 4/2004 |
| EP | 2226487 | 9/2010 |
| EP | 2295763 | 3/2011 |
| EP | 2320067 | 5/2011 |
| EP | 1959114 B1 | 5/2012 |
| EP | 2728140 | 5/2014 |
| EP | 3043056 | 7/2016 |
| EP | 3273031 | 1/2018 |
| EP | 3273034 | 1/2018 |
| EP | 3273032 | 4/2018 |
| EP | 3309371 | 4/2018 |
| FR | 991975 | 10/1951 |
| FR | 1262452 | 5/1961 |
| FR | 1594317 | 6/1970 |
| GB | 713839 | 8/1954 |
| GB | 1102591 | 2/1968 |
| WO | WO95/02120 A1 | 1/1995 |
| WO | 2005/061873 | 7/2005 |
| WO | WO200845068 | 4/2008 |
| WO | WO201533336 | 3/2015 |
| WO | 20150122948 | 8/2015 |
| WO | WO2015122948 | 8/2015 |
| WO | 2017/198999 | 11/2017 |

OTHER PUBLICATIONS

European Search Report dated Mar. 21, 2018 in related EP application No. 17182094.7.
European Search Report dated Apr. 6, 2018 in related EP application No. 17193893.9.
European Search Report dated Nov. 30, 2017 in counterpart EP application No. 17182102.8.
European Search Report dated Dec. 12, 2017 in related EP application No. 17182076.4.
European Search Report dated Dec. 12, 2017 in related EP application No. 17182096.2.
European Search Report dated Jan. 31, 2018 in related EP application No. 17185796.4.
European Search Report dated Jul. 2, 2018 in relating EP application No.° 18154161.6.
A New Approach to Turboshaft Engine Growth, M. A. Compagnon, General Electric Company, Lynn,Massachusetts pp. 80-41-1 to 80-41-6, May 13, 1980.
European Search Report dated May 25, 2018 in related EP application No. 17191309.8.
European Search Report dated May 25, 2018 in related EP application No. 17186249.3.

* cited by examiner

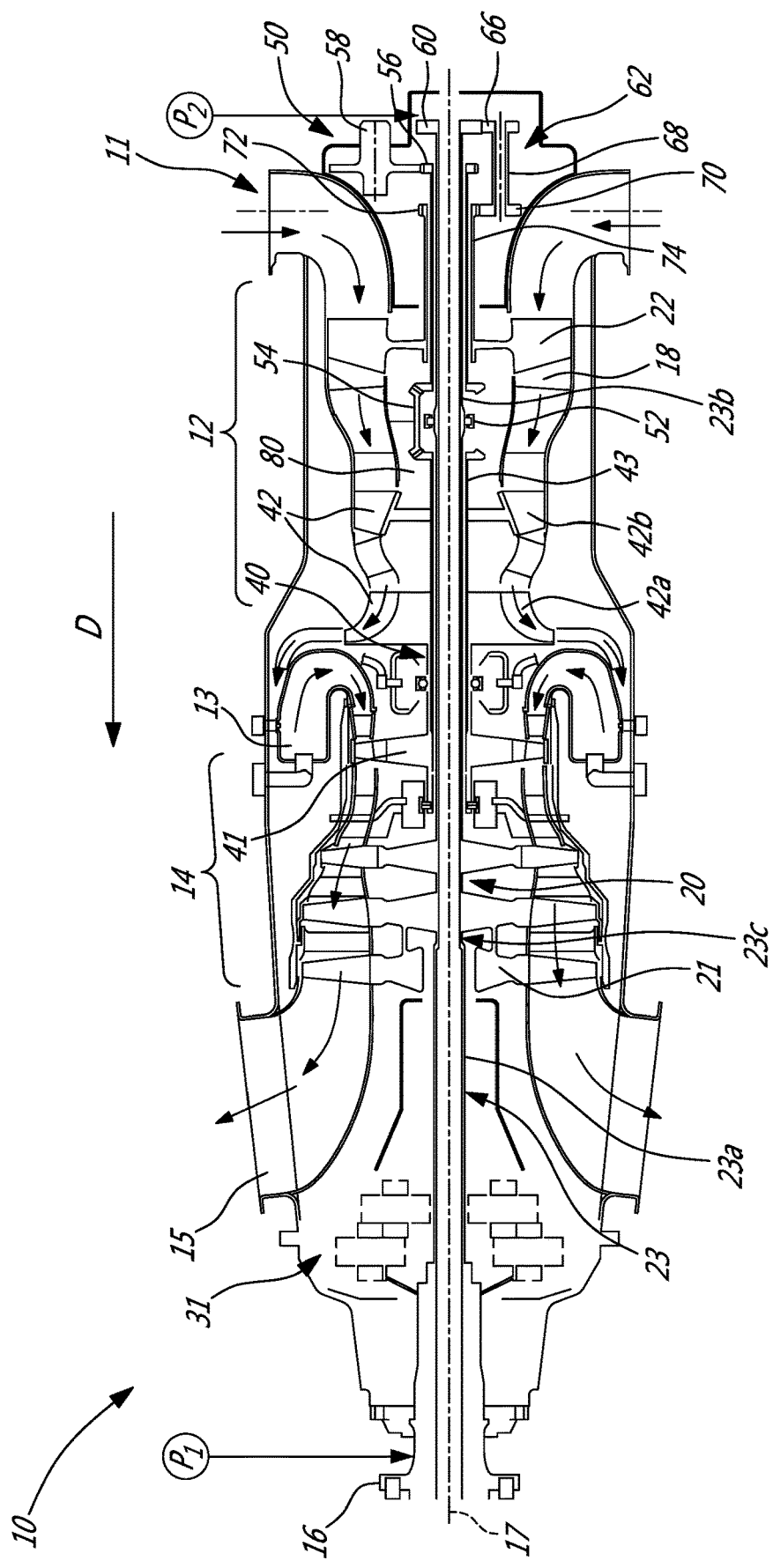

TURBINE ROTOR WITH LOW OVER-SPEED REQUIREMENTS

TECHNICAL FIELD

The application relates generally to gas turbine engines and, more particularly, to systems and methods for reducing over-speed potential of a turbine.

BACKGROUND OF THE ART

Mechanical failure of a gas turbine engine spool can result in a turbine becoming decoupled from the mechanical load it is driving, thereby resulting in an over-speed of the turbine. Such an over-speed condition can lead to structural failure of the turbine disk and/or associated blades. To alleviate this concern, the turbine disks and the blades are strengthened to accommodate the stresses induced by such over-speed conditions, which result in heavier and more robust components than is otherwise necessary for normal engine operation.

SUMMARY

In one aspect, there is provided a gas turbine engine comprising: first and second mechanical drives extending in opposite directions from a power turbine rotor for driving at least two independent mechanical loads disposed on opposed sides of the power turbine rotor.

In another aspect, there is provided a gas turbine engine comprising: a turbine rotor rotatable about an engine axis, a first turbine shaft extending from the turbine rotor in a first direction for transferring a torque to a first rotatable load, and a second turbine shaft extending from the turbine rotor in a second direction for transferring a torque to a second rotatable load, the second direction being opposite to the first direction.

In a further aspect, there is provided a method for reducing over-speed potential of a turbine of a gas turbine engine, wherein the turbine is rotatable about an engine axis, the method comprising: mechanically connecting the turbine to at least two mechanical loads via first and second mechanical drives extending in opposite directions from the turbine.

DESCRIPTION OF THE DRAWING

FIG. 1 is a schematic cross-section view of a multi-spool gas turbine engine comprising a power turbine drivingly connected to two independent mechanical loads via two mechanical drives extending in opposite directions from the power turbine rotor.

DETAILED DESCRIPTION

There is disclosed examples of systems and methods involving turbines connected to two or more mechanical loads via separate mechanical drives such that the complete loss of any one load does not result in a turbine rotor over-speed as high as if all the loads would be lost simultaneously. In other words, because the turbine remains partially loaded in any cases of single failures or less probable double failure, the turbine rotor acceleration is less during the time required for an electronic engine control (EEC) to detect the failure and the maximum speed reached will be much less compared to the maximum speed that would be reached in a compete load loss scenario.

As will be seen hereinafter, the at least two loads are arranged in such a way that failure of the mechanical drive on one of the loads does not result in the consequential failure of the mechanical drive on the at least second load. According to at least some of the embodiments, this is achieved by having first and second mechanical drives extending in opposite directions from the turbine rotor such that no failure knock-on effect from one drive can fail the second drive. Even higher independency can be achieved by having two axially opposite mechanical drives including two separate shafts, one shaft projecting forward of the turbine to drive a first load and a second shaft projecting aft of the turbine to drive a second load. Another embodiment could be provided with drives extending radially (instead of axially) in generally opposite directions from the turbine) the basic principle being to keep each drive isolated from damages that may occur or be generated by the other drive.

Referring now in more details to FIG. 1, there will be described an example of a multi spool engine 10 having a power turbine rotor system designed with two independent mechanical loads. However, it is understood that the turbine rotor system could be designed with more than two mechanical loads. The engine shown in FIG. 1 is of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion oases, a turbine section 14 for extracting energy from the combustion gases, an exhaust outlet 15 through which the combustion gases exit the engine 10. The engine 10 further has a drive output shaft 16 having a front end configured to drive a rotatable load (not shown). The load can, for instance, take the form of a propeller or a rotor, such as a helicopter main rotor. Depending on the intended use, the engine 10 can be configured as a turboprop engine or a turboshaft engine. FIG. 1 illustrates a turboprop configuration. The gas turbine engine 10 has a centerline or longitudinal center axis 17 about which the compressor and turbine rotors rotate.

The gas turbine engine 10 has an axially extending central core which defines a gaspath 18 through which gases flow, as depicted by flow arrows in FIG. 1. The exemplary embodiment shown in FIG. 1 is a "reverse-flow" engine because gases flow through the gaspath 18 from the air inlet 11 at a rear portion thereof, to the exhaust outlet 15 at a front portion thereof. This is in contrast to "through-flow" gas turbine engines in which gases flow through the core of the engine from a front portion to a rear portion. The direction of the flow of gases through the gaspath 18 of the engine 10 disclosed herein can be better appreciated by considering that the gases flow through the gaspath 18 in the same direction D as the one along which an aircraft engine travels during flight: Stated differently; in the non-limitative example shown in FIG. 1, gases flow through the engine 10 from a rear end thereof towards the output shaft 16.

It will thus be appreciated that the expressions "forward" and "aft" used herein refer to the relative disposition of components of the engine 10, in correspondence to the "forward" and "aft" directions of the engine 10 and aircraft including the engine 10 as defined with respect to the direction of travel. In the embodiment shown, a component of the engine 10 that is "forward" of another component is arranged within the engine 10 such that it is located closer to output shaft 16 (e.g. closer to the propeller in a turboprop application). Similarly, a component of the engine 10 that is "aft" of another component is arranged within the engine 10 such that it is further away from the output shaft 16.

Still referring to FIG. 1, the engine 10 has multiple spools which perform compression to pressurize the air received through the air inlet 11, and which extract energy from the combustion gases before they exit the gaspath 18 via the exhaust outlet 15. More particularly, the illustrated embodiment comprises a low pressure (LP) spool 20 and a high pressure (HP) spool 40 mounted for rotation about the engine axis 17. The LP and HP spools 20, 40 are independently rotatable about the axis 17. The term "spool" is herein intended to broadly refer to drivingly connected turbine and compressor rotors and is, thus, not limited to a compressor and turbine assembly on a single shaft. As will be seen hereinbelow, it also includes a rotary assembly with multiple shafts geared together.

The LP spool 20 includes at least one component to compress the air that is part of the compressor section 12, and at least one component to extract energy from the combustion gases that is part of the turbine section 14. More particularly, the LP spool 20 has an LP turbine 21, also known as a power turbine, which may include different number of stages (three stages in the illustrated embodiment), and which drives an LP compressor 22 (also referred to as a boost). The LP turbine 21 drives the LP compressor 22, thereby causing the LP compressor 22 to pressurize incoming air from the air inlet 11. The LP compressor 22 is disposed just forward of the air inlet 11. Both the LP turbine 21 and the LP compressor 22 are disposed along the center axis 17. In the depicted embodiment, both the LP turbine 21 and the LP compressor 22 include rotatable components having an axis of rotation that is coaxial with the center axis 17. It is understood that they may include one or more stages depending upon the desired engine thermodynamic cycle.

The LP turbine 21 is forward of the LP compressor 22. The LP turbine 21 is also aft of the exhaust outlet 15. The LP compressor 22 is forward of the air inlet 11. This arrangement of the LP turbine 21 and the LP compressor 22 provides for a reverse-flow engine 10 that has one or more LP compressor stages located at the rear of the engine 10, and which are driven by one or more low pressure turbine stages located at the front of the engine 10.

The LP spool 20 further comprises an LP shaft 23 coaxial with engine axis 17. The LP turbine 21 is drivingly connected to the LP shaft 23. The LP shaft 23 allows the LP turbine 21 to drive the LP compressor 22 during operation of the engine 10. The LP shaft 23 may be drivingly connected to the LP compressor 22 via a gear train. Increasing the speed of the LP compressor relative to the LP turbine via a gear train has the advantage of increasing the effective LP compressor inertia seen by the LP turbine (to the square of the speed increase). This higher effective LP compressor inertia further contributes to the limitation of the maximum speed reached by the LP turbine in case of a primary load decouple.

Still referring to FIG. 1, it can be appreciated that the LP shaft 23 also extends axially forwardly from the LP turbine 21 for driving the output shaft 16. The LP shaft 23 is drivingly connected to the output shaft 16 via a suitable reduction gear box (RGB) 31. A rotatable load, a propeller (not shown) according to the illustrated example, is connectable to a front end of the output shaft 16. In this way, the LP turbine 21 can be used to drive the rotatable load (e.g. the propeller) at a reduced speed relative to the speed of the LP turbine 21. In such a configuration, during operation of the engine 10, the LP turbine 21 drives the rotatable load such that a rotational drive produced by the LP turbine 21 is transferred to the rotatable load via the LP shaft 23, the RGB 31 and the output shaft 16 coming out forwardly from the RGB 31. The rotatable load can therefore be any suitable component, or any combination of suitable components, that is capable of receiving the rotational drive from the LP turbine section 21.

The RGB 31 processes and outputs the rotational drive transferred thereto from the LP turbine 21 via the LP shaft 23 through known gear reduction techniques. The RGB 31 allows for the load (e.g. the propeller according to the illustrated turboprop example) to be driven at its optimal rotational speed, which is different from the rotational speed of the LP turbine 21. The RGB 31 is axially mounted at the front end of the engine 10. The RGB 31 has an input and an output axis parallel (coaxial in the illustrated embodiment) to the central axis 17 of the engine 10.

In an alternate embodiment where the engine 10 is a turboshaft, the rotational load (which may include, but is not limited to, helicopter main rotor(s) and/or tail rotor(s), propeller(s) for a tilt-rotor aircraft, pump(s), generator(s), gas compressor(s), marine propeller(s), etc.) is driven by the LP turbine 21 via the RGB 31, or the RGB 31 may be omitted such that the output of the engine 10 is provided directly by the LP shaft 23.

The LP shaft 23 with the portions thereof extending forward and aft of the LP turbine 21 provides the engine 10 with bidirectional drive. Indeed, the LP turbine 21 drives both an external rotatable load (e.g. a propeller) and the LP compressor 22. Furthermore, the rotatable load, when mounted to the engine 10, and the LP compressor 22 are disposed on opposite ends of the LP turbine 21. It can thus be appreciated that one or more low pressure turbine stages are used to drive elements in front of the LP turbine (e.g. propeller, RGB 31, etc.) as well as to drive elements to the rear of the LP turbine (e.g. LP compressor 22). This configuration of the LP turbine 21 allows it to simultaneously drive the rotatable load and the LP compressor 22.

The LP shaft 23 may comprise distinct shaft sections in opposed axial directions from the LP turbine 21. For instance, the LP shaft 23 may comprise a power turbine shaft 23a and an LP compressor drive shaft 23b connected to the LP turbine 21 at connection 23c. It is understood that any suitable connections could be provided between adjacent LP shaft sections 23a, 23b and the LP turbine disks of the LP turbine. For instance, the connection 23c could comprise axial splines. It is also understood that the LP shaft 23 can be integral with a first portion of the LP shaft extending axially rearwardly from the LP turbine 21, and a second portion (a power turbine segment) extending between the RGB 31 and the LP turbine 21 forwardly from the LP turbine 21. Whether the LP shaft 23 is integral or segmented. The LP turbine 21 provides rotational drive outputted at each end of the LP shaft 23 (the LP turbine 21 is drivingly connected to distinct loads on opposite sides thereof).

As mentioned herein above, according to the illustrated example, the LP turbine (i.e. The power turbine) 21 is connected to a first load (propeller on shaft 16) disposed forward of LP turbine 21 and to a second load (the LP compressor 22) disposed aft of the LP turbine 21. The power turbine shaft 23a provides a first mechanical drive between the propeller and the LP turbine 21. The LP compressor drive shaft 23b provides a second mechanical drive between the LP compressor 22 and the LP turbine 21. The power turbine shaft 23a and the LP compressor drive shaft 23b extend in opposite directions from the LP turbine 21. This provides for two independent torque paths on opposed sides of the LP turbine 21. In this way, failure of the mechanical drive on one load does not result in the consequential failure of the mechanical drive on the second load. That is the rupture of the compressor drive shaft 23b on one side of the LP turbine 21 will not result in the rupture of the power turbine shaft 23a and vice versa. In this way, a load can be maintained on the LP turbine 21 even in the event of a failure of one of the mechanical drives, thereby reducing over-speed potential of the LP turbine 21.

Due to the absence of more severe over-speed conditions, the disks of the LP turbine 21 can be designed for an over-speed condition as low as 120% of the maximum normal operating speed (the absolute minimum required by the Canadian Aviation Regulations as defined in Chapter 533 of the Airworthiness Manual—Aircraft engines, the entire contents of which is herein incorporated by reference), compared to approximate 140% seen on typical applications disks and blades and that with no negative impact on safety. By having LP turbine disks designed for over-speeds less than 140%, the weight and the costs of the engine can be reduced:

First and second speed probes P1, P2 are respectively provided on the first and second mechanical drives. The speed probes P1 P2 are operatively connected to the electronic engine control (EEC) (not shown). The EEC receives inputs from the speed probes P1, P2 and provides corresponding outputs for controlling the operation of the gas turbine engine 10. As shown in FIG. 1, the first speed probe P1 can be disposed at a front end of the engine to measure the speed of the output shaft 16 and the second speed probe P2 may be positioned at the rear end of the engine to measure the speed of the LP compressor 22. By providing at least two independent mechanical loads to the LP turbine 21, the LP turbine 21 remains loaded in the unlikely event that one of the loads is unloaded from the LP turbine as a result of a structural failure of the associated mechanical drive. In one embodiment, this allows to design with slower reaction times for the EEC since at least a portion of the normal operating load is still applied to the LP turbine 21 via the remaining mechanical drive, which constrains the LP turbine acceleration, thereby giving more time to the EEC to react to avoid the LP turbine reaching a critical over-speed, in another embodiment, this allows, for a given EEC reaction time, to design a smaller LP turbine: The LP turbine acceleration being constrained by the a portion of the normal operating load still applied, its terminal speed after the given EEC reaction time will be lower than if all the LP turbine loads would be decoupled simultaneously.

According to a non-limiting embodiment, the compressor drive shaft 23b extends axially through a central bore of the LP compressor 22 to a location aft of the LP compressor 22 for connection with an axially mounted boost gear train disposed on an aft facing side of the LP compressor 22. The boost gear train also forms part of the second mechanical drive connecting the LP turbine to the LP compressor.

Still referring to FIG. 1, the HP spool 40 has at least one component to compress the air that is part of the compressor section 12, and at least one component to extract energy from the combustion gases that is part of the turbine section 14. The HP spool 40 is also disposed along the center axis 17 and includes a HP turbine 41 (also referred to as the compressor turbine) drivingly engaged (e.g. directly connected) to an HP compressor 42 by an HP shaft 43 rotating independently of the LP shaft 23. In the illustrated embodiment, the HP shaft 43 is a hollow shaft which rotates around the LP shaft 23. That is the LP shaft 23 extends axially through the HP shaft 43. The HP turbine 41 and the HP compressor 42 may include one or more stages of rotors, depending upon the desired engine thermodynamic cycle, for example. In the depicted embodiment, the HP compressor 42 includes a centrifugal compressor 42a or impeller and an axial compressor 42b, both of which are driven by the HP turbine 41. During operation of the engine 10, torque is transferred from HP turbine 41 to the HP compressor 42 via HP shaft 43.

In the exemplified reverse flow engine configuration, the HP turbine 41 is aft of the LP turbine 21, and forward of the combustor 13. The HP compressor 42 is aft of the combustor 13, and forward of the LP compressor 22. From this arrangement of the HP turbine 41 and the HP compressor 42, it can be appreciated that during operation of the engine 10, the LP compressor 22 driven by the LP turbine 21 feeds pressurized air to the HP compressor 42. Therefore, the pressurized air flow produced by the LP compressor 22 is provided to the HP compressor 42 and contributes to the work of both the LP turbine 21 and the HP turbine 41. The LP turbine 21 is sometimes referred to as the "power turbine".

The HP turbine 41 and the HP compressor 42 can have any suitable mechanical arrangement to achieve the above-described split compressor functionality. For example, and as shown in FIG. 1, the HP shaft 43 extends concentrically about the LP shaft 23 and is independently rotatable relative thereto. The relative rotation between the HP shaft 43 and the LP shaft 23 allow the shafts 23, 43 to rotate at different rotational speeds, thereby allowing the HP compressor 42 and the LP compressor 22 to rotate at different rotational speeds. The HP shaft 43 can be mechanically supported by the LP shaft 23 using bearings or the like.

Still referring to the embodiment shown in FIG. 1, the engine 10 also includes an accessory gearbox (AGB) 50. The AGB 50 receives a rotational input from the HP spool 40 and, in turn, drives accessories (e.g. fuel pump, starter-generator, oil pump, scavenge pump, etc.) that contribute to the functionality of the engine 10. The AGB 50 can be designed with side-facing accessories, top-facing accessories, or rear-facing accessories depending on the installation needs.

According to the illustrated embodiment, the AGB 50 is concentrically mounted axially aft of the LP compressor 22 as an axial extension of the engine envelope. The axial positioning of the AGB 50 allows minimizing the overall radial envelope of the engine as compared to a split compressor or boosted engine having the AGB mounted on a side of the engine and connected to the HP spool via a tower shaft. In the illustrated embodiment, the AGB 50 is accommodated within the envelope of the engine in a plane normal to the central axis 17.

In the illustrated embodiment, the AGB input drive axis is coaxial to the LP compressor centerline and, thus, the engine axis 17. By so aligning the input axis of the AGB 50 relative to the LP compressor centerline, the drive input to the AGB 50 can be provided centrally through the LP compressor 22, thereby eliminating the need for a tower shaft and an externally mounted gear arrangement. However, unlike conventional reverse flow engines (like the well-known PT6 engine manufactured by Pratt & Whitney Canada), which do not include a compressor boost, the presence of the LP compressor 22 axially between the HP compressor 42 and the AGB 50 physically interferes with the connection of the AGB 50 with the HP spool 40, which is disposed on the opposed axially facing side of the LP compressor 22. In the illustrated embodiment, this particular problem is overcome by extending the HP shaft 43 through a central bore or passage in the LP compressor 22. The HP shaft 43 thus provides a drive input to the AGB 50 coaxial to the engine axis 17. According to the embodiment illustrated in FIG. 1, the HP shaft 43 is segmented between the HP compressor 42 and the LP compressor 22 to allow for the introduction of a bearing 52 configured to provide support to the LP shaft 23 between the HP compressor 42 and the LP compressor 22. A gear 54 may be provided to drivingly couple the HP compressor shaft segment of the HP shaft 43 to an AGB drive input shaft segment, which may also be viewed as being an extension of the HP shaft 43. The gear 54 may be provided in the form of a bevel gear having a 1:1 speed ratio. The bevel gear may be set to have a rotation axis perpendicular to the rotation axis of the HP shaft segments. Such a gear arrangement allows for the installation of a support and bearing structure for supporting the LP shaft 23.

The AGB drive input shaft segment projects axially into the AGB 50 and is provided at a distal end thereof with a gear 56, which is in meshing engagement with an associated AGB output gear 58. In the illustrated example, the AGB output gear 58 has a rotation axis parallel to the engine axis 17. The output gear 58 is drivingly connected to accessories (not shown). It is understood that the accessories gear train in the AGB 50 can adopt various configurations, including multiple outputs and different gear ratios.

Still referring to FIG. 1, it can be appreciated that an LP compressor gear train 62 is integrated to the AGB 50 to drivingly couple the LP shaft 23 and, thus, the LP turbine 21 to the LP compressor 22. As mentioned herein above, the gear connection between the LP turbine 21 and the LP compressor 22 is advantageous in that it allows driving the LP compressor 22 at a different speed than the LP turbine 21. The LP compressor rotor inertia perceived by the LP turbine is increased to the square of the speed increase between the LP turbine and the LP compressor rotor. Therefore, increasing the speed of the LP compressor rotor through a gear train provides a higher effective inertia to resist the LP Turbine acceleration in case of a mechanical drive decoupling on the other load (propeller, helicopter rotor, etc.).

The LP shaft 23 projects ail the way to the aft end of the engine into the AGB 50 axially beyond the HP shaft 43 for connection with the gear train 62. The gear train 62 comprises an input gear 60 provided at the distal end portion of the LP shaft 23, the end portion which projects outwardly of the HP shaft 43. The input gear 60 is in meshing engagement with a second gear 66 mounted at an aft end of a transfer shaft 68 having a rotation axis parallel to the engine axis 17. A third gear 70 is provided at an opposed forward end of the transfer shaft 68 for meshing engagement with a fourth gear 72 provided at the distal end of a LP compressor shaft 74 projecting axially from an aft facing surface of the LP compressor 22. The LP compressor shaft 74 is a hollow shaft extending concentrically about the HP shaft 43. The LP compressor shaft 74 ends at a location forward of the HP shaft 43, to thereby allow the HP shaft 43 to be drivingly connected to gear 58. It can be appreciated that the relative lengths of the shafts 23, 43, 74 projecting into the AGB 50 allows for the various gear connections (the innermost shaft having the deepest AGB penetration).

The various embodiments of the above described engine architecture provide for a method for reducing over-speed potential of a turbine of a gas turbine engine. In particular, the method may encompass mechanically connecting a turbine (e.g. a power turbine) to at least two mechanical loads (e.g. a propeller and a LP compressor) via first and second mechanical drives where the position of each drive is selected to prevent mechanical failures from one drive to decouple the other drive (e.g. drives located in axially or radially opposite directions from the turbine). According to a particular embodiment, the turbine is an LP turbine. However, it is understood that the same principles could be equally applied to an HP turbine.

According to at least some of the embodiment, mechanically connecting the turbine to at least two mechanical loads comprises connecting the turbine to a first mechanical load disposed forward of the turbine, and connecting the turbine to a second mechanical load disposed aft of the turbine. The relative positioning of the loads relative to the turbine may be used to eliminate any points of failure which could unload both mechanical drives at once.

The first mechanical load may be a propeller, a helicopter rotor or a generator, while the second load may be a compressor. According to an embodiment, mechanically connecting the turbine to at least two mechanical loads comprises drivingly connecting a power turbine shaft and a compressor drive shaft to the turbine, the power turbine shaft and the compressor drive shaft extending in opposite directions from the turbine.

The above description is meant to be exemplary only, and one skilled in the art will recognize that changes may be made to the embodiments described without departing from the scope of the invention disclosed. Modifications which fail within the scope of the present invention will be apparent to those skilled in the art, in light of a review of this disclosure, and such modifications are intended to fall within the appended claims.

The invention claimed is:

1. A multi-spool gas turbine engine comprising:
a low pressure spool including first and second mechanical drives extending from a power turbine rotor mounted for rotation about an engine axis for driving at least two mechanical loads disposed on opposed sides of the power turbine rotor, the at least two mechanical loads including 1) a low pressure compressor and 2) a propeller or a helicopter rotor, wherein the first mechanical drive comprises a reduction gearbox and the second mechanical drive comprises a gear train drivingly connected to a compressor drive shaft extending axially from the power turbine rotor, the gear train configured to increase the speed of the low pressure compressor relative to the power turbine;
a high pressure spool including a high pressure turbine drivingly connected to a high pressure compressor via a high pressure shaft; and
an accessory gearbox (AGB) drivingly connected to the high pressure spool, the low pressure compressor disposed axially between the high pressure compressor and the AGB, the compressor drive shaft extending centrally through the low pressure compressor into the AGB.

2. The multi-spool gas turbine engine defined in claim 1, wherein the first mechanical drive comprises a power turbine shaft extending axially from the power turbine rotor in a first axial direction, the compressor drive shaft extending axially from the power turbine rotor in a second axial direction, and wherein the second axial direction is opposite to the first axial direction.

3. The multi-spool gas turbine engine defined in claim 2, wherein the power turbine shaft is drivingly connected to an input end of the reduction gearbox.

4. The multi-spool gas turbine engine defined in claim 3, wherein the propeller or helicopter rotor is drivingly connected to an output end of the reduction gearbox.

5. The multi spool gas turbine engine defined in claim 4, wherein the low pressure compressor is drivingly connected to the compressor drive shaft via the gear train, the gear train being disposed in the AGB.

6. A multi spool gas turbine engine comprising:
- a low pressure spool including: a turbine rotor rotatable about an engine axis, a first turbine shaft extending from the turbine rotor in a first direction for transferring a torque to a first rotatable load, and a second turbine shaft extending from the turbine rotor in a second direction for transferring a torque to a low pressure compressor, the second direction being opposite to the first direction, and a gear train drivingly connecting the turbine rotor to the low pressure compressor, the gear train configured to increase a speed of the low pressure compressor relative to the turbine rotor;
- a high pressure spool including a high pressure turbine drivingly connected to a high pressure compressor via a high pressure shaft; and
- an accessory gearbox (AGB) drivingly connected to the high pressure spool, the low pressure compressor disposed axially between the high pressure compressor and the AGB, the second turbine shaft extending centrally through the low pressure compressor into the AGB.

7. The multi-spool gas turbine engine defined in claim 6, wherein the turbine rotor is a power turbine, the first turbine shaft being a power turbine shaft drivingly connected to the first rotatable load, the second turbine shaft being a low pressure compressor drive shaft drivingly connected to the low pressure compressor.

8. The multi-spool gas turbine engine defined in claim 7, wherein the power turbine shaft is drivingly connected to an input end of a reduction gear box.

9. The multi-spool gas turbine engine defined in claim 8, wherein the first rotatable load is a propeller or a helicopter rotor drivingly connected to an output end of the reduction gearbox.

10. A method for reducing over-speed potential of a power turbine of a low pressure spool of a multi-spool gas turbine engine, wherein the power turbine is rotatable about an engine axis and drivingly connected to a low pressure compressor via a low pressure compressor shaft, the multi-spool gas turbine engine having a high pressure spool including a high pressure turbine drivingly connected to a high pressure compressor, the high pressure spool drivingly connected to an accessory gearbox (AGB), the low pressure compressor disposed axially between the high pressure compressor and the AGB, the method comprising: mechanically connecting the power turbine to at least two mechanical loads via first and second mechanical drives extending in opposite directions from the turbine, wherein the first mechanical load is a propeller or a helicopter rotor, and wherein the second mechanical load includes the low pressure compressor, wherein a gear train drivingly connects the power turbine to the low pressure compressor, the gear train configured to increase a speed of the compressor relative to the turbine, and wherein the low pressure compressor shaft is drivingly connected to the gear train in the AGB.

11. The method defined in claim 10, wherein mechanically connecting the power turbine to at least two mechanical loads comprises connecting the power turbine to a first mechanical load disposed forward of the power turbine, and connecting the power turbine to a second mechanical load disposed aft of the power turbine.

12. The method defined in claim 10, wherein the first and second mechanical drives respectively comprise a power turbine shaft and the low pressure compressor shaft, the low pressure compressor shaft being separate from the power turbine shaft, and wherein mechanically connecting the power turbine to at least two mechanical loads comprises drivingly connecting the power turbine shaft and the low pressure compressor shaft to the power turbine, the power turbine shaft and the low pressure compressor shaft extending in opposite directions from the power turbine.

* * * * *